United States Patent [19]

Green

[11] Patent Number: 4,919,852

[45] Date of Patent: Apr. 24, 1990

[54] LIGHTWEIGHT CERAMIC INSULATION AND METHOD

[75] Inventor: David J. Green, State College, Pa.

[73] Assignee: The United States of America as represented by the Administrator of the National Aeronautics and Space Administration, Washington, D.C.

[21] Appl. No.: 213,392

[22] Filed: Jun. 30, 1988

[51] Int. Cl.5 .............................................. B29B 33/02

[52] U.S. Cl. .......................................... 264/6; 264/11; 264/43; 264/28

[58] Field of Search .......................... 264/6, 11, 43, 28

[56] References Cited

U.S. PATENT DOCUMENTS 3,516,935 6/1970 Monforte et al. ................ 252/62.56
4,246,209 1/1981 Smith/Johannsen ................. 264/28
4,286,378 9/1981 Micheli ................................ 29/621
4,526,734 7/1985 Enomoto ............................. 264/13

*Primary Examiner*—James Derrington
*Attorney, Agent, or Firm*—Russell F. Schlorff; John R. Manning; Edward K. Fein

[57] ABSTRACT

A process for manufacturing a low density ceramic powder which can be formed to make a lightweight material for insulation or other construction. The ceramic product made from the process has a final density of less than 25% to about 1% of its theoretical weight of the ceramic powder. The ceramic product is lightweight and can be made to withstand high temperatures greater than 1400° C.

6 Claims, No Drawings

LIGHTWEIGHT CERAMIC INSULATION AND METHOD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

TECHNICAL FIELD

This invention relates to the area of lightweight, high temperature resistant insulation product and a process for making the product. The insulation product can be used in ceramic or metallurgical industrial applications which require high temperature insulation as well as the aerospace field for space vehicle insulation.

BACKGROUND ART

Low density insulation materials used in high temperature conditions are commonly made of fibrous ceramic materials. A typical material is $SiO_2$ fibers used for outside tiles for aerospace vehicles. These materials withstand temperatures up to 1390° C. and have a density of as low as 0.14 g/cm$^3$. These materials are highly anisotropic because of the fibrous microstructure.

Ceramics have been made by spraying a solution or slurry of ceramic producing salts in a cryogenic liquid. In some instances the solvent is freeze-dried such that the ice is removed by sublimation in a vacuum to produce a ceramic powder. In other applications the frozen slurry is molded by freezing the slurry into the final shape.

The ceramic powder is formed into the desired shape and fired. This technique, as described in U.S. Pat. No. 3,516,935, produces a homogeneous ceramic body with more uniform structural characteristics than a fibrous ceramic. The density of the final ceramic product is close to theoretical or single crystal density.

Porous ceramics have been made by precipitating the salt, filtering the solution and freeze-drying the precipitate. The powder is a flaky-like particle which yields a ceramic with a porous but interlocked, irregular microstructure.

STATEMENT OF THE INVENTION

This invention is for a freeze-dried powder which can be formed into low density, ceramic insulation and the process for making the powder. Water soluble salts are used which after heating or chemical conversion can become high temperature ceramic. The salt sòlution is about 75% to about 99.5% water.

The solution containing the salts is sprayed into a cryogenic liquid. The rapid freezing of the relatively dilute salt solution produces a solid with a fine microstructure. The frozen solids are placed in a vacuum chamber and freeze dried to remove the ice. The resultant solid is a powder containing porous aggregates. The relative percentage of water will control the solids in the aggregates. The porous powder is formed using casting or molding techniques. The pressing process is controlled to achieve the desired final density.

The formed powder is sintered at temperatures from 1475° C. to 1600° C. This gives a final ceramic product with a porous, spherulitic morphology. The method of this invention can produce lightweight ceramics less than the theoretical weight of the ceramic solid by varying the degree of salinity of the aqueous solution and the forming process and pressure used to make the final product. The final density can be as low as approximately 1% of the theoretical weight of the ceramic solid. A range for a lightweight material would be 1% to 25% of the theoretical weight of the ceramic. This is due to the extensive fine porosity in the aggregates, typically $<1\mu m$, and their resistance to densification. The material is less anisotropic and has superior strength characteristics as compared to fibrous ceramics.

DETAILED DESCRIPTION OF THE INVENTION

The first step in making the lightweight ceramic is preparing an aqueous solution of water soluble salt or a mixture of salts which after heating or chemical conversion can become a high temperature ceramic. There are numerous salts which are available such as oxide, nitride and carbide salts. The aqueous solution is 75% to 99.5% water. The degree of porosity of the final product has a direct relationship to the dilution of the aqueous solution. A more dilute salt solution gives a more porous product.

The aqueous solution is sprayed into a cryogenic liquid such as nitrogen to rapidly frozen. The frozen material has a very fine microstructure. The ice is removed by evaporation under a vacuum, the freeze drying process to yield a powder with porous aggregates. The freeze-dried powders can be subject to calcination after drying to remove any residual water and to decompose the salts. This process further increases the amount of porosity in the aggregates. A dilute salt solution can give aggregates which contain less than 1% by volume of solid. The powder with the porous aggregates when formed and sintered gives a low density product.

The powder is then formed using conventional procedures such as molding, slip casting, injection molding or other forming techniques known in the art. The fine porosity of the powder provides a microstructure that is resistant to densification. The pressing of the formed powder is controlled to give the final density desired. In this process, it is critical not to break down the aggregates. Typically, there is very little shrinkage of the powder compact during the final firing so that the pressed density is approximately the same as the fired density. Thus in the forming operation, one presses the powder to a particular volume such that the pressed density (weight of powder/pressed volume) is that required in the final product.

The formed material is sintered to produce a ceramic product. The sintering temperature usually in excess of 800° C. and is dependent on the salt solution selected. High temperature ceramics can be produced by this method and are typically sintered at temperature as high as 1700° C. The temperature range is typically between 1475°-1700° C. for sintering high temperature ceramics.

A ceramic of the invention was made by preparing a solution containing sodium carbonate ($Na_2CO_3$) and aluminum sulfate [$Al_2(SO_4)_3$] in a 1:6 weight ratio respectively mixed with 94% water by volume. The solution was sprayed into cryogenic liquid nitrogen. The frozen solids were placed in a vacuum chamber and subjected to a freeze dry process to remove the ice. The resultant powder was formed in circular molds up to 2 inches in diameter and uniaxially pressed up to 10 psi. The molds were subjected to a sintering process at temperatures from 1475° C. to 1600° C. The resulting product was a rigid ceramic of greater than 90% porosity that resisted densification at all temperatures.

Hand pressed 3/8" diameter discs were prepared according to the method described above using a solution of $Na_2O.Al_2O_3$($\beta$-$Al_2O_3$) in 94% aqueous solution. The discs were fired at 1475° C. and later fired again at 1600° C. The final density after each firing was measured and reported in the following Table 1.

TABLE 1

| DISC | INITIAL DENSITY ($g/cm^3$) | FIRING TEMPERATURE (°C.) | FINAL DENSITY ($g/cm^3$) |
|---|---|---|---|
| 1 | 0.51 | 1475 | 0.52 |
| 2 | 0.29 | 1475 | 0.29 |
| 1 | 0.52 | 1600 | 0.55 |
| 2 | 0.29 | 1600 | 0.31 |

The theoretical density is 3.26 $glcm^3$. The results show the achievement of the low density material. The results also show small shrinkage during firing.

The ceramic can be used as insulation in any situation where a lightweight material is desired. The insulation can also withstand high temperatures. Thus, the ceramic insulation of this invention can be used in aerospace and smelting operations as examples.

What is claimed is:

1. A method for making a ceramic comprising the steps of:

(a) dissolving at least one water soluble salt which after heating or chemical conversion can become a high temperature ceramic in water such that after dissolution the solution contains 75% to 99.5% water by volume;

(b) spraying the salt and water solution prepared in step (a) into a cryogenic liquid;

(c) evaporating the water of the solution under vacuum below the freezing point of the solution to produce a powder;

(d) forming the powder material; and (e) sintering the formed material at greater than 800° C.

2. A method for making a ceramic according to claim 1 wherein said cryogenic liquid of step (b) is nitrogen.

3. A method for making a ceramic according to claim 1 including the step of calcination prior to the forming step (d).

4. A method for making a ceramic according to claim 1 wherein said forming step (d) comprises molding and uniaxial pressing of the mold.

5. A method for making a ceramic according to claim 1 wherein said forming step (d) is selected from the processes of injection molding, slip casting, and casting.

6. A method for making a ceramic according to claim 1 wherein in step (e) said sintering temperature range is 1475°-1700° C.

* * * * *